United States Patent [19]

George et al.

[11] 4,155,809
[45] May 22, 1979

[54] VARIABLE STIFFNESS LATTICE SUPPORT SYSTEM FOR A CONDENSER TYPE NUCLEAR REACTOR CONTAINMENT

[75] Inventors: John A. George, Greensburg, Pa.; John D. Sutherland, Jacksonville, Fla.

[73] Assignee: Westinghouse Electric Corp., Pittsburgh, Pa.

[21] Appl. No.: 766,646

[22] Filed: Feb. 8, 1977

[51] Int. Cl.² ............................................. G21C 13/02
[52] U.S. Cl. .................................... 176/87; 176/38; 248/68 R
[58] Field of Search ............... 176/38, 87; 248/68 R, 248/204

[56] References Cited

U.S. PATENT DOCUMENTS

| 3,055,538 | 9/1962 | Schoessow | 176/87 X |
|---|---|---|---|
| 3,438,430 | 4/1969 | Kestemont | 176/87 X |
| 3,488,067 | 1/1970 | Sommer | 176/87 X |
| 3,844,885 | 10/1974 | Weems et al. | 176/38 X |
| 3,865,688 | 2/1975 | Kleimola | 176/38 X |
| 3,907,151 | 9/1975 | Gilden | 176/87 X |
| 3,991,960 | 11/1976 | Tanaka | 248/68 R |
| 4,001,079 | 1/1977 | Rylatt | 176/87 |
| 4,011,132 | 3/1977 | Kumpf et al. | 176/87 X |

Primary Examiner—Peter A. Nelson
Attorney, Agent, or Firm—Edward L. Levine; Z. L. Dermer

[57] ABSTRACT

A support structure for the lattice supporting a fusible material in the annular condenser region of a nuclear reactor containment, the flexibility of which structure can be selectively adjusted in accordance with seismic or other loading requirements. The lattice is affixed to a flexible member in a manner which allows relative movement between the two components. The flexible member is affixed to a rigid support member in a manner which selectively adjusts the resiliency of the flexible member. The support member is rigidly affixed to a wall of the containment annulus, and can also be utilized to support cooling ducts.

6 Claims, 2 Drawing Figures

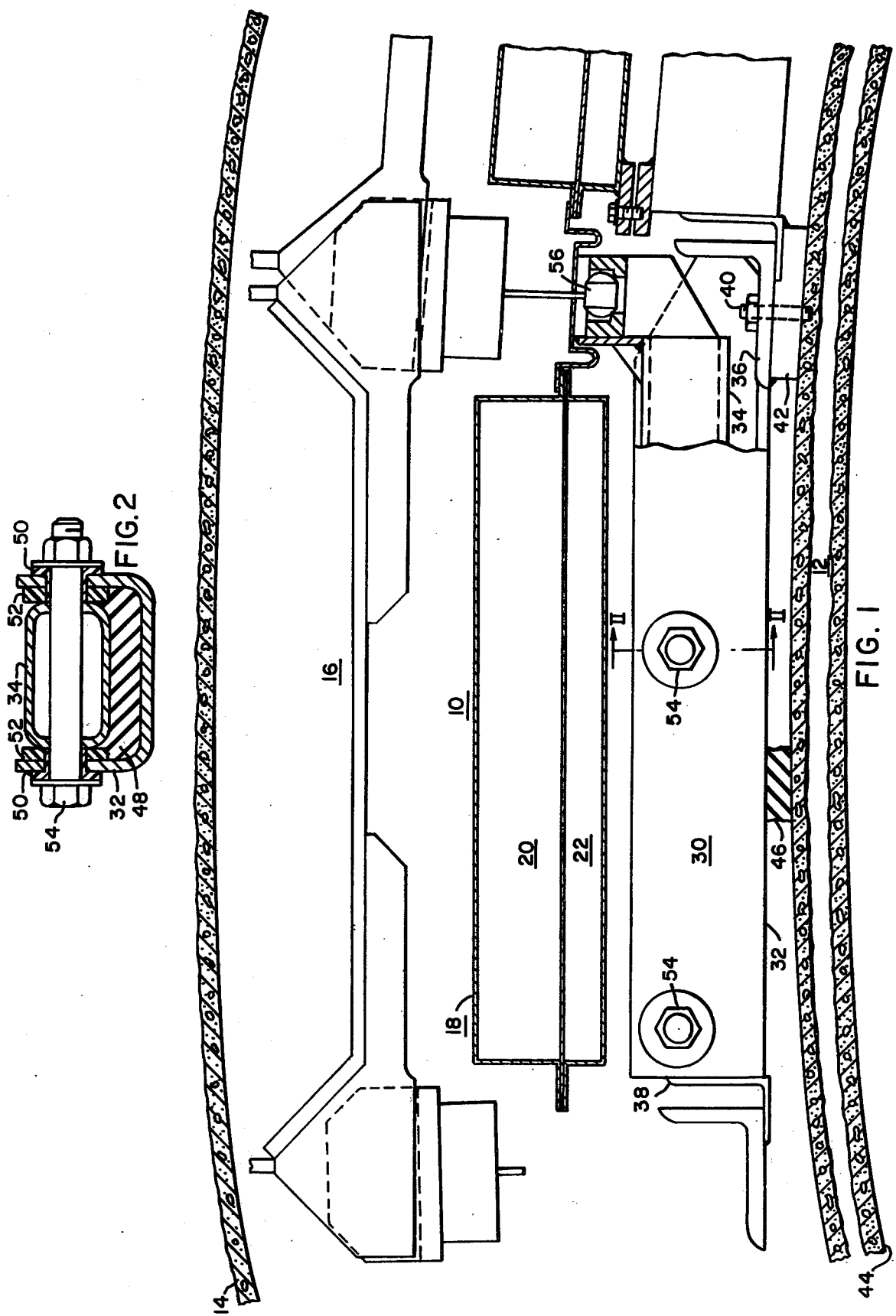

VARIABLE STIFFNESS LATTICE SUPPORT SYSTEM FOR A CONDENSER TYPE NUCLEAR REACTOR CONTAINMENT

BACKGROUND OF THE INVENTION

1. Field of the Invention

This invention relates to nuclear reactors, and more particularly provides a variable stiffness support system for support structure in the annular region of a condenser type reactor containment.

2. Description of the Prior Art

Commercial nuclear reactors typically include a primary reactor system circulating a fluid coolant through a reactor core. The primary system is enclosed in a reactor containment building. Consistent with the stringent safety oriented attitudes of the nuclear industry, the containment is designed to withstand a pressure transient under assumed major accident conditions. A particular containment design includes a fusible material such as ice, in the solid state, supported in a lattice within an annular region surrounding the primary system to quench the pressure transient. This "condenser" type containment is more fully described in U.S. Pat. No. 3,423,286.

Within the annular region are not only large quantities of the fusible material typically held in baskets supported in a lattice structure, but also cooling ducts extending vertically about sixty feet, to circulate a cooling medium, such as air, thereby maintaining the fusible material in solid form. Support of the lattice and the ducts has, in the past, been performed by massive mechanical structures which include a multitude of fasteners. This large and complex support structure resulted from stringent design limitations including (1) the need for insulating the support structure from the atmospheric temperature surrounding the primary system, (2) the large pressure loading on the outer surface of the cooling ducts under accident conditions, and (3) the large mechanical loadings transmitted to the structure under seismic or other abnormally high mechanical loadings. Also, these limitations, particularly the latter, are variable with each nuclear plant, and therefore required provision of separately designed support structure with different frequency response at each individual plant.

The prior art support structures therefore include a large beam rigidly affixed to the annulus wall, heavily insulated, with numerous connections to the ducts and the lattice, both of which are supported from the beam. The beam transmits both duct and lattice loads to the concrete or steel wall of the annulus. The structure must be specifically designed for proper seismic response, including different beams for each reactor plant.

It is highly advantageous to provide a support structure that minimizes the massive support structures presently designed, that is easily adjustable for plant sites with varying seismic spectrums, that minimizes the amount of fasteners, and that is compatible with existing duct and lattice structures.

SUMMARY OF THE INVENTION

This invention provides a structure for supporting the lattice which supports a fusible material, such as ice, in the solid state, in the annular region of a condenser-type reactor containment. The inventive support structure affixes the lattice to a wall of the annular region in a manner which not only is easily adjustable to varying seismic requirements, but which also significantly lessens the mass of the support structure and the number of fasteners required. It further allows the pressure load on the vertical cooling ducts which have a very high surface area to be transmitted under accident conditions directly to the annular region wall, and not necessarily through the lattice support structure.

The lattice support structure includes a horizontal elongated support member, such as a U-shaped channel, spaced from, and rigidly affixed to, an annular wall. Within the horizontal member is a flexible member, such as a hollow rectangular tube. The horizontal support member and flexible member are affixed such that the flexibility of the flexible member is selectively adjustable. This attachment can be by joining of the two members with two bolts. Varying the position of the bolts varies the flexibility of the flexible member and the resulting bending under load. The lattice structure is movably coupled to the flexible member by a connection, such as a spherical bushing, that allows relative motion between the lattice and the flexible member.

The cooling ducts can be rigidly affixed directly to the wall or to the horizontal support member so that pressure loads under accident conditions are transmitted directly from the ducts, to the support member, and to the annular wall.

It will be evident that the same lattice support structure can be utilized at nuclear plants designed for different seismic loading, merely by varying the position of the bolts joining the flexible member and the support member. Under seismic or other inordinately high mechanical loading of the annular wall, the disclosed support structure assures that an improper frequency loading of the lattice is avoided.

BRIEF DESCRIPTION OF THE DRAWINGS

The functions and advantages of this invention will become more apparent from the following description and accompanying drawings in which:

FIG. 1 is a plan view, partially in section, of the disclosed apparatus positioned in the annular region of a condenser type nuclear reactor containment; and FIG. 2 is a view, in section, taken at II—II of FIG. 1.

DESCRIPTION OF THE PREFERRED EMBODIMENTS

FIG. 1 illustrates a segment of an annular region 10 of a condenser-type nuclear reactor containment bounded by an inner wall 12 and an outer wall 14 of concrete or steel. Shown within the annulus 10 is the outline of a lattice 16 which supports a fusible material, such as ice. It is to be understood that although a lattice 16 is shown at one elevation, a plurality exist at various elevations within the annular region 10. Also shown is a cooling duct 18 through which is circulated a cooling fluid, such as air, to maintain the fusible material at an acceptable temperature and in a solid state. The cooling fluid is circulated upwardly through a first duct section 20 and downwardly through a second duct section 22, in heat exchange relation with apparatus not shown.

Shown in FIGS. 1 and 2 is a lattice support structure 30. The support structure 30 includes a horizontally positioned generally rigid support member 32 and a flexible member 34 positioned generally with the support member 32. The cross-sectional configuration of the members 32 and 34 can take many forms. As shown best in FIG. 2, the support member 32 can be an open channel, such as a U-shape, and the flexible member 34 can be of a generally rectangular cross section.

The support member 32 can abut against, but preferably is spaced from the inner concrete wall 12. It is, however, rigidly affixed to the wall 12, preferably at the support member 32 extremities, such as by angles 36 and 38 and mounting means such as a stud 40 and plate 42. Lattice 16 loading can therefore be transmitted through the mounting means to the inner concrete wall 12.

It will be recognized that the inner side 44 of the inner concrete wall 12 is exposed to a high temperature environment (approximately 120° F.) relative to the fusible material and the circulating cooling duct fluid. It is therefore desirable to insulate the lattice support structure 30. This can be accomplished by placing insulation 46 between the lattice support structure 30 and the inner wall 12. Further, an insulating barrier is formed by positioning compressible insulation 48 between the flexible 34 and support 32 members, as well as utilization of insulated bushings 50 and rigid insulation slabs 52 about flexibility adjustment bolts 54, discussed below.

The lattice 16 is movably coupled to the flexible member 34 at one point by means such as a spherical bushing and plate structure 56 which allows multidirectional motion of the lattice 16 relative to the flexible member 34. At another point the lattice 16 is slidably affixed to an adjacent lattice such as through a sliding dowel pin connection allowing free horizontal motion over a preselected distance.

Any loads transmitted between the lattice 16 and the inner wall 12 are transferred, for example, from the lattice 16, through the movable coupling 56 to the flexible member 34; the flexible member 34 communicates with the support member 32 as discussed below, thereby transferring the load to the support member 32, through the means rigidly affixing the support member 32 to the wall 12, and finally to the wall 12. With this arrangement, a portion of the load can be taken by the flexible member 34; by proper adjustment of the resiliency of the flexible member 34, critical frequencies transmitted to the lattice 16 under, for example, seismic loading, can be avoided.

This preselected adjustment can be accomplished by affixing the flexible member 34 to the generally rigid support member 32 at preselected positions. The flexible member 34 acts as a resilient beam, the flexibility of which is adjustable by preselecting the support points. The figures show utilization of two flexibility adjustment bolts 54, although other quantities and types of fastening means may be utilized. It should further be noted that the flexibility can also be adjusted by shaping the flexible member so as to provide a desired moment of inertia, or by fabricating the member as a laminated structure.

With the lattice support structure 30 described, the cooling ducts 18 can be independently affixed directly to the inner wall 12 through structure placed at elevations above or below the lattice support 30. If desired, the ducts 18 can also be supported through the angle-stud-plate (36-40-42) connection, or otherwise connected directly to the support member. In either case, the lattice support need not be unnecessarily stiffened to compensate for the high duct pressure loads under accident conditions.

There has therefore been described a variable stiffness support structure for a fusible material containing lattice of a condenser type nuclear reactor containment building. It will be apparent that many modifications and additions are possible in view of the above teachings. It therefore is to be understood that within the scope of the appended claims the invention may be practiced other than as specifically described.

We claim:

1. An improved nuclear reactor plant of the type including a primary reactor system circulating a fluid coolant, a containment structure enclosing said primary system, a generally vertical wall disposed between said primary system and said containment forming an annular condenser region between said wall and said containment, and a plurality of lattice structures positioned within said annular region for support of a fusible material, wherein the improvement comprises structure for resiliently affixing each said lattice to said wall including:
   (a) a horizontally disposed elongated support member spaced from and disposed generally parallel to said wall;
   (b) means for rigidly affixing said support member to said wall;
   (c) a flexible member disposed generally within said support member;
   (d) means affixing said support member to said flexible member for preselected adjustment of the flexibility of said flexible member; and
   (e) means for movably coupling said lattice to said flexible member.

2. The plant of claim 1 wherein said means for preselected adjustment comprise two bolts affixing said support member and said flexible member at preselected locations.

3. The plant of claim 1 wherein said elongated support member is a "U"-shaped channel.

4. The plant of claim 1 wherein said flexible member is a hollow tube of generally rectangular cross section.

5. The plant of claim 1 wherein said flexible member comprises a laminated assembly.

6. The plant of claim 1 wherein each said lattice further comprises means for slidably affixing said lattice to an adjacent lattice.

* * * * *